(12) United States Patent
Nagaraja et al.

(10) Patent No.: US 12,106,235 B2
(45) Date of Patent: Oct. 1, 2024

(54) SYSTEM FOR FORECASTING AIRCRAFT ENGINE DETERIORATION USING RECURRENT NEURAL NETWORKS

(71) Applicant: United Technologies Corporation, Farmington, CT (US)

(72) Inventors: Sharath B. Nagaraja, Manchester, CT (US); Mathew R. Greco, Tolland, CT (US)

(73) Assignee: RTX Corporation, Farmington, CT (US)

( * ) Notice: Subject to any disclaimer, the term of this patent is extended or adjusted under 35 U.S.C. 154(b) by 439 days.

(21) Appl. No.: 16/360,480

(22) Filed: Mar. 21, 2019

(65) Prior Publication Data
US 2020/0301406 A1    Sep. 24, 2020

(51) Int. Cl.
*G06Q 10/04* (2023.01)
*B64F 5/60* (2017.01)
(Continued)

(52) U.S. Cl.
CPC ............ *G06Q 10/04* (2013.01); *B64F 5/60* (2017.01); *G05B 23/0281* (2013.01);
(Continued)

(58) Field of Classification Search
CPC ........... G05B 23/0283; G05B 23/0281; G05B 23/024; G05B 13/027; B64F 5/60;
(Continued)

(56) References Cited

U.S. PATENT DOCUMENTS 5,857,321 A    1/1999  Rajamani et al.
10,474,789 B2 * 11/2019 Ethington .......... G05B 23/0283
(Continued)

FOREIGN PATENT DOCUMENTS

| EP | 2434127 | 3/2012 |
|----|---------|--------|
| EP | 3260943 | 12/2017 |
| WO | 2018098230 | 5/2018 |

OTHER PUBLICATIONS

European Search Report for Application No. 20164888.8 dated Jul. 7, 2020.
(Continued)

*Primary Examiner* — Jason Holloway
*Assistant Examiner* — Madison B Emmett
(74) *Attorney, Agent, or Firm* — Carlson, Gaskey & Olds, P.C.

(57) ABSTRACT

A method for forecasting aircraft engine deterioration includes creating a first fused data set corresponding to a first actual aircraft engine. The first fused data set includes at least one as manufactured parameter of the actual aircraft engine, expected operating parameters of the first actual aircraft engine, and actual operating parameters of the actual aircraft engine. The actual operating parameters of the actual aircraft engine include internal aircraft sensor data, and external flight tracking data. The method further includes predicting an expected engine deterioration of the first actual engine based on the expected operating parameters and the actual operating parameters of the first actual aircraft engine by applying the first fused data set to a forecasting model. The forecasting model is a recurrent neural network based algorithm, and the recurrent neural network based algorithm is trained via a plurality of second fused data sets corresponding to actual aircraft engines.

5 Claims, 7 Drawing Sheets

(51) Int. Cl.
*G05B 23/02* (2006.01)
*G06F 18/25* (2023.01)
*G06N 3/04* (2023.01)
*G08G 5/00* (2006.01)
*H04W 4/029* (2018.01)

(52) U.S. Cl.
CPC ......... *G05B 23/0283* (2013.01); *G06F 18/25* (2023.01); *G06N 3/04* (2013.01); *G08G 5/0026* (2013.01); *G08G 5/0039* (2013.01); *G08G 5/006* (2013.01); *H04W 4/029* (2018.02)

(58) Field of Classification Search
CPC ....... H04W 4/029; G06K 9/6288; G06N 3/04; G08G 5/0026; G08G 5/0039; G08G 5/006; G06Q 10/04; G06Q 10/20; F05D 2260/80; F05D 2260/821; F02C 9/28
See application file for complete search history.

(56) References Cited

U.S. PATENT DOCUMENTS

| | | | | |
|---|---|---|---|---|
| 11,181,898 | B2* | 11/2021 | Akkaram | G05B 23/0254 |
| 2009/0226303 | A1* | 9/2009 | Grabowski | F02K 3/06 |
| | | | | 701/100 |
| 2010/0082267 | A1* | 4/2010 | Schimert | G05B 19/4065 |
| | | | | 702/34 |
| 2017/0217606 | A1 | 8/2017 | Fisher et al. | |
| 2018/0011481 | A1 | 1/2018 | Smit et al. | |
| 2018/0067480 | A1* | 3/2018 | Ellis | G05D 1/042 |
| 2018/0268288 | A1* | 9/2018 | Vandike | G05B 23/024 |
| 2018/0307784 | A1 | 10/2018 | Stevens et al. | |
| 2019/0003954 | A1 | 1/2019 | Detor et al. | |
| 2019/0005826 | A1* | 1/2019 | Lax | G08G 5/0091 |
| 2019/0016478 | A1 | 1/2019 | Kessie et al. | |
| 2019/0146000 | A1* | 5/2019 | Hurst | G05B 23/0289 |
| | | | | 702/144 |
| 2019/0354644 | A1* | 11/2019 | Orhan | B64D 45/00 |
| 2020/0012751 | A1* | 1/2020 | Snyder | G01M 15/14 |
| 2020/0079532 | A1* | 3/2020 | Rix | G06N 20/20 |
| 2020/0174457 | A1* | 6/2020 | Salapakkam | G05B 13/0265 |
| 2020/0317371 | A1* | 10/2020 | Somanath | G06Q 10/20 |
| 2022/0081129 | A1* | 3/2022 | Wiedemann | G05B 23/0283 |
| 2022/0414460 | A1* | 12/2022 | Soleyman | G06N 3/0455 |

OTHER PUBLICATIONS

European Search Report for EP Application No. 23217317.9 dated Feb. 16, 2024.

* cited by examiner

SYSTEM FOR FORECASTING AIRCRAFT ENGINE DETERIORATION USING RECURRENT NEURAL NETWORKS

TECHNICAL FIELD

The present disclosure relates generally to planning aircraft maintenance schedules, and more specifically to a machine learning based system for forecasting engine deterioration to assist in maintenance schedule planning.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Due to the continued operation of the gas turbine engine, as well as the complexity of the components and structures within the engine, gas turbine engines require routine maintenance in order to ensure continued peak operations. Scheduled maintenance allows an aircraft operator to plan and predict when a particular engine will be out of commission for maintenance, and is scheduled based on expected part life cycles. Unscheduled maintenance occurs when there is a rapid deterioration of components within the engine, and reduces the time on wing of a given engine. Further, unscheduled maintenance can negatively impact fleet operations, and require reconfiguration of a fleet of aircraft.

In some cases the cause of, or factors contributing to, rapid deterioration are known or obvious. By way of example, ingestion of a bird or large debris into a fan section of an engine will cause rapid deterioration requiring maintenance. In other cases, however, the cause of rapid deterioration may not be known, and it is difficult or impossible to adjust maintenance schedules to compensate. Further exacerbating this difficulty is the fact that rapid deterioration can be the result of combinations of factors, where each of the factors alone would not result in such a deterioration.

SUMMARY OF THE INVENTION

An exemplary method for forecasting aircraft engine deterioration includes creating a first fused data set corresponding to a first actual aircraft engine, the first fused data set including at least one as manufactured parameter of the actual aircraft engine, expected operating parameters of the first actual aircraft engine, and actual operating parameters of the actual aircraft engine, the actual operating parameters of the actual aircraft engine including internal aircraft sensor data, and external flight tracking data, and predicting an expected engine deterioration of the first actual engine based on the expected operating parameters and the actual operating parameters of the first actual aircraft engine by applying the first fused data set to a forecasting model, wherein the forecasting model is a recurrent neural network based algorithm, and the recurrent neural network based algorithm is trained via a plurality of second fused data sets corresponding to actual aircraft engines.

Another example of the above method for forecasting aircraft engine deterioration further includes updating the expected engine deterioration of the first aircraft engine by modifying the first fused data set to incorporate at least one of an updated maintenance history and/or updated actual operating parameters.

In another example of any of the above methods for forecasting aircraft engine deterioration updating the expected engine deterioration further includes applying the updated fused data set to the recurrent neural network based algorithm.

In another example of any of the above methods for forecasting aircraft engine deterioration creating the first fused data set comprising normalizing data in each of the actual operating parameters of the actual aircraft engine.

In another example of any of the above methods for forecasting aircraft engine deterioration the external flight tracking data includes weather service data corresponding to a geographic location of the actual aircraft engine.

In another example of any of the above methods for forecasting aircraft engine deterioration the external flight tracking data includes global position data.

In another example of any of the above methods for forecasting aircraft engine deterioration the external flight tracking data includes at least one environmental condition at one of a takeoff and a landing of the actual aircraft engine.

In another example of any of the above methods for forecasting aircraft engine deterioration the forecasting model includes a correlation of at least two factors within the first fused data set, the correlation being indicative of rapid engine deterioration.

In another example of any of the above methods for forecasting aircraft engine deterioration each of the at least two factors is not independently indicative of rapid engine deterioration.

Another example of any of the above methods for forecasting aircraft engine deterioration further includes discarding at least one data set from the plurality of second fused data sets, wherein the at least one discarded data set includes a rapid engine deterioration attributable to an independent known event.

In another example of any of the above methods for forecasting aircraft engine deterioration the recurrent neural network based algorithm includes a multi-dimensional matrix input passed through a plurality of hidden layers.

In another example of any of the above methods for forecasting aircraft engine deterioration the multi-dimensional matrix input includes a time-step dimension, a data set dimension, and an engine identifier dimension.

In another example of any of the above methods for forecasting aircraft engine deterioration the plurality of second fused data sets includes a first subset configured to train the recurrent neural network based algorithm, and a second subset configured to test the recurrent neural network based algorithm.

In another example of any of the above methods for forecasting aircraft engine deterioration the first subset includes 70 percent of the data sets within the plurality of second fused data sets.

Another example of any of the above methods for forecasting aircraft engine deterioration further includes adjusting at least one of an aircraft route and an aircraft operating region based on an output of the forecast model.

In another example of any of the above methods for forecasting aircraft engine deterioration the forecast model comprises a plurality of regional models, with each regional model corresponding to a distinct region.

An exemplary method for optimizing aircraft engine operations includes creating a first fused data set corresponding to a first actual aircraft engine, applying the first fused data set to a forecasting model including at least two sub-models, each of the sub models corresponding to an operating region, and implementing the aircraft engine in a region corresponding to the sub model having a best predicted life.

Another example of the above described exemplary method for optimizing aircraft engine operations further includes determining a maintenance schedule for the aircraft based on the predicted life.

In another example of any of the above described methods for optimizing aircraft engine operations the maintenance schedule includes at least one on-wing maintenance operation.

These and other features of the present invention can be best understood from the following specification and drawings, the following of which is a brief description.

DETAILED DESCRIPTION

Figure 1:
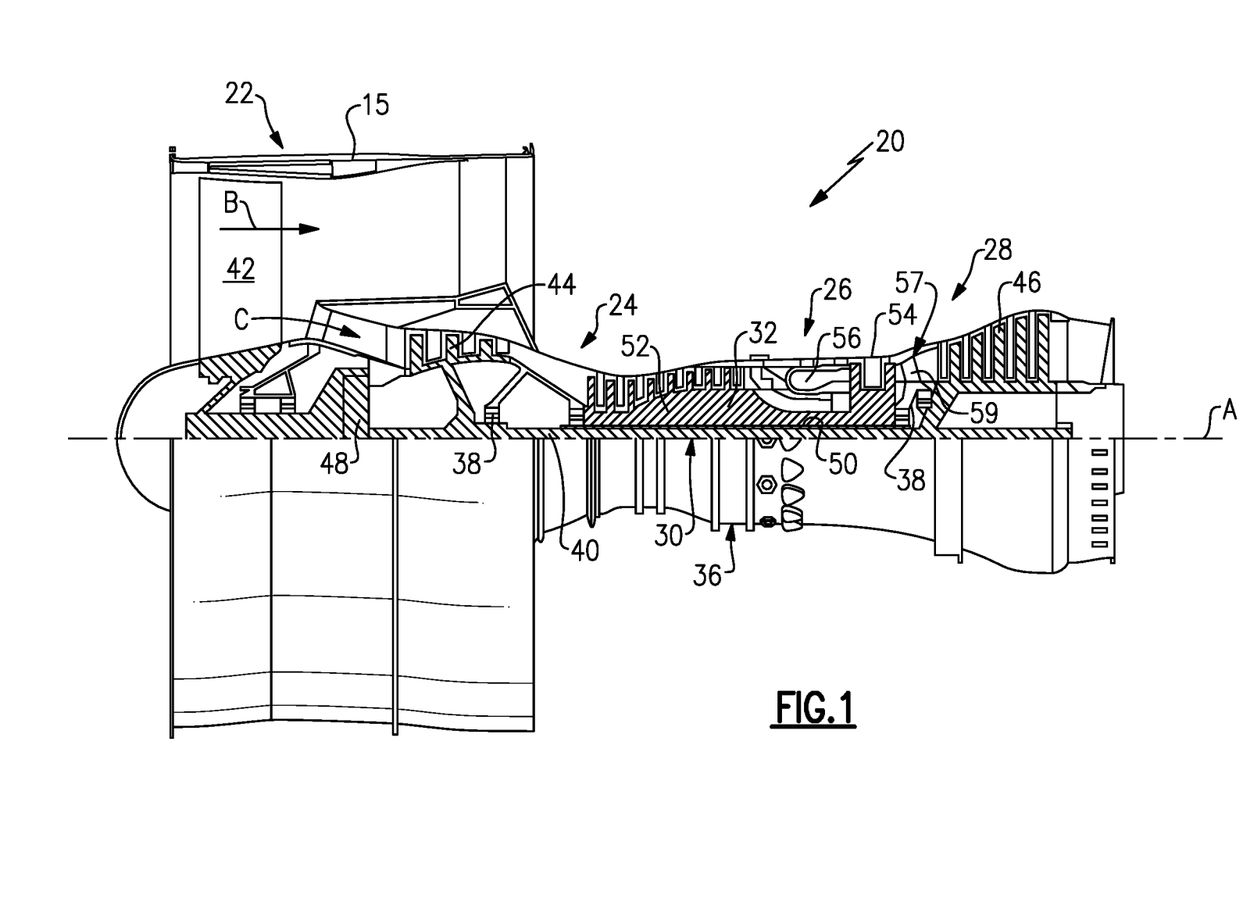
FIG. 1 illustrates a high-level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high-speed spool 32 includes an outer shaft 50 that interconnects a second (or high) pressure compressor 52 and a second (or high) pressure turbine 54. A combustor 56 is arranged in exemplary gas turbine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 that are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{R})/(518.7 \text{ }°\text{R})]^{-0.5}$. The "Low corrected fan tip speed" as disclosed herein according to one non-limiting embodiment is less than about 1150 ft/second (350.5 meters/second).

The exemplary engine 20 is a geared turbofan engine. It is appreciated that the rapid engine deterioration forecasting concepts described herein can be applied to any type of gas turbine engine in the same manner to achieve similar results and a geared turbofan engine is illustrated to provide an example of the complexity of the underlying systems.

Aircraft engine deterioration, which leads to required maintenance, is a function of usage, ambient conditions, air quality at landing and takeoff, as well as any other number of identified and unknown factors. Rapid engine deterioration (i.e. deterioration that is faster than a nominal expectation) causes reduced part life, and can cause component failures resulting in unscheduled engine removal. The unscheduled engine removal disrupts airline operations, and can result in unexpected financial costs.

As discussed above, the causes of rapid engine deterioration can be known (e.g. ingestion of large debris) or the result of unknown combinations of factors. Predicting maintenance schedules for the unknown combinations of factors is difficult or impossible with current data sources, and forecasting models.

Figure 2:
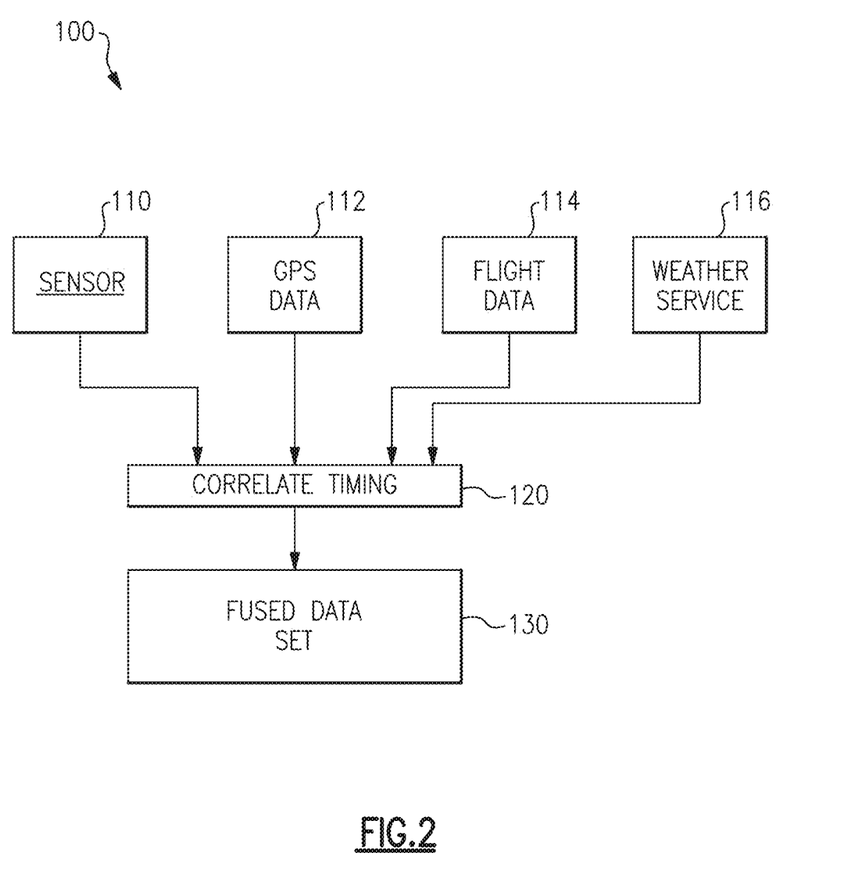
FIG. 2 schematically illustrates an exemplary process for fusing engine operations data into a correlated data set.

FIG. 2 illustrates a process 100 for receiving data from multiple data sources 110, 112, 114, 116 and combining the data sources into a fused data set 130 that can be used to create a forecast model and/or be applied to a forecast model to predict rapid engine deterioration. In the illustrated example, the data sources include an aircraft sensor system 110, a global positioning system (GPS) data source 112, flight data 114 from a flight tracking system external to the aircraft, and weather data 116 from a weather tracking system. Each of the data sets 110, 112, 114, 116 includes time stamped data, indicating a time at which the data is acquired. The listed data sets 110, 112, 114, 116 are exemplary in nature, and other data sets can include, but are not limited to, aerosol data, flight tracking data, engine operation data, or any similar collected data. In a practical implementation, the data sets 110, 112, 114, 116 are derived from data internal to the aircraft (e.g. the aircraft sensor data 110), as well as data originating from sources outside of the aircraft (e.g. the weather service data 116).

Using the time stamps on the data, the data is correlated in a correlate timing system 120. The correlate timing system 120 is a computerized system that consolidates the data from each data source into entries in a single database for each time. Where entries in one data set 110, 112, 114, 116 have a longer time period then entries from another data set 110, 112, 114, 116 the entries from the data set 110, 112, 114, 116 with the lower frequency (i.e. longer duration between time stamps) are extended across multiple timestamps to normalize the data. By way of example, weather service data 116 may only include minute-by-minute data, whereas aircraft sensor data 110 may include data time stamped every millisecond. In such an example, a given entry in the weather data set 116 is applied to each entry in the aircraft sensor data set 110 within that increment.

In addition, a spatial correlation is also conducted to map aerosol data obtained from satellites to the flight path. The satellite data is available in a latitude/longitude (lat/lon) grid over the surface of the earth. For each point during the flight, the system searches which lat/lon grid the flight is located in. Once determined, the system merges the lat/lon data with the corresponding aerosol values to the sensor data at that instance.

In addition to the data from each of the multiple data sets 110, 112, 114, 116, the correlate timing process 120 adds data to the fused data set 130 indicating each instance of maintenance, including what type of maintenance occurred and whether the maintenance was scheduled or unscheduled, to the resultant fused data set 130.

A single fused data set 130 tracks a single engine's operation over the course of the engine's lifecycle. Fused data from a single engine, however, is not sufficient to develop a forecasting model capable of determining correlations and adjusting maintenance schedule operations to compensate for previously unknown combinations of factors that result in rapid engine deterioration. In one example, the process of creating the fused dataset is automated using a scalable big-data architecture. The process runs automatically as new data is ingested into the system, and the architecture conducts the processing in a parallel fashion, which can seamlessly handle rapid increase in the size of the data.

Figure 3:
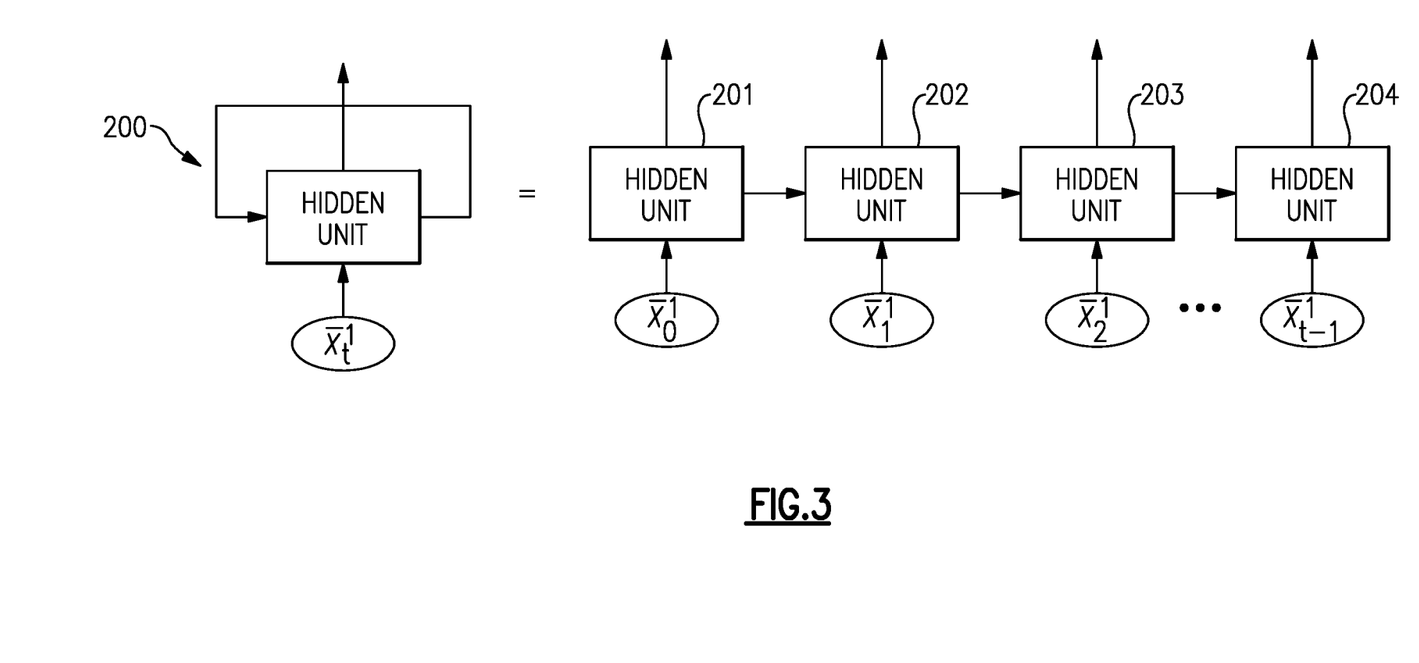
FIG. 3 is a visual representation of a single recurrent neural network cyclic unit.

With continued reference to FIG. 2, FIG. 3 schematically illustrates a process for identifying combinations of factors that lead to rapid deterioration within an engine structure, and adjusting a maintenance schedule to compensate. Initially, the process of FIG. 2 is utilized to create multiple fused data sets corresponding to multiple engines in a "Create Fused Data."

The fused data is used to train a predictive model with historical data, and validate the model's accuracy with a holdout/test dataset. The model is then used for inference and forecasting. If an engine exhibits high deterioration, the data of the high deterioration engine is passed through the model, and examined for the most important correlating factors. Based on the factors, the system then determines corrective maintenance action that can be taken.

The deterioration prediction system described herein employs a recurrent neural network (RNN) deep learning model for predicting the deterioration rate based on causal factors. One exemplary type of RNN that can be used is a Long Short-Term Memory (LSTM) neural network architecture. LSTM architectures are more robust to noise and don't suffer from convergence issues that may be present in previous RNN models.

Multi-variate time series problems (such as deterioration forecasting) are challenging because the correlations between inputs and output can depend both on immediate history of operation, and on longer-term effects. For example, high engine deterioration can be caused by short-term extreme weather events such as sandstorms. Over a longer period of time, not conducting recommended maintenance can also lead to high deterioration. In order to account for these multi time-scale effects, traditional machine learning algorithms (random forests, gradient boosting, or other standard neural networks) require substantial manual effort and time devoted to creating aggregate or sliding window inputs such as cumulative sum etc. (referred to in the art as feature engineering). These manually engineering features might not be effective in finding the correlations that fall out of the window considered for aggregation.

Recurrent neural networks provide a better alternative since they can accept the time history of multiple variables as inputs. The output (here the engine deterioration rate) is a function of not just the most recent value of input variables, but rather depends on entire history of inputs. Using this approach, the deterioration prediction system removes the manual step of providing aggregated inputs, and allows the algorithm to search the entire time history of inputs to find the best correlations to the output.

RNN's take each time-step 201, 202, 204 one at a time to train the model. In other words, a vector of inputs at each time instant are applied to the RNN unit 200. The network retains its current state while accepting the next time-step 201, 202, 203, 204 values. RNNs model the time aspect of data by creating cycles. FIG. 3 provides a visual representation of a single RNN cyclic unit. The hidden unit 200 is trained with all the time-steps 201, 202, 203, 204 of an input variable. No limit is set on length of the time-series, and the time series can be arbitrarily long unlike sliding windows in traditional models, which are of fixed length.

Figure 4:
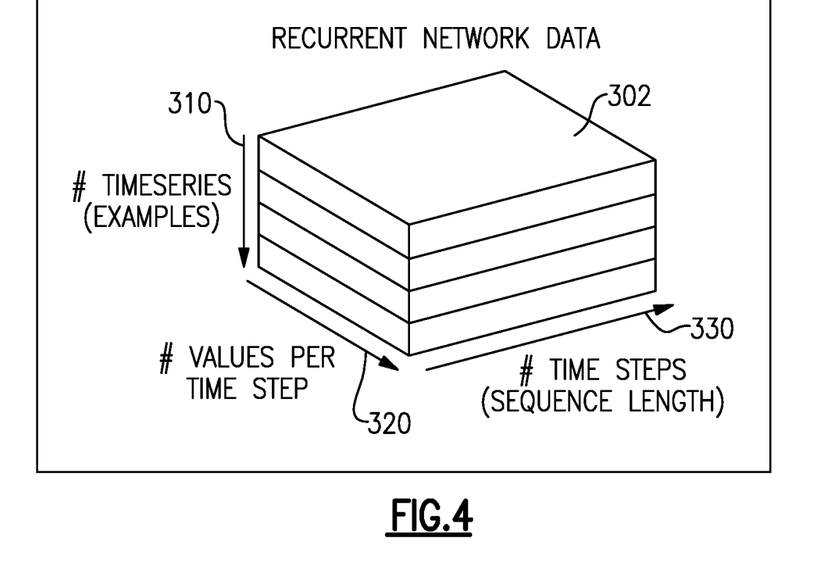
FIG. 4 illustrates an exemplary recurrent neural network input.

The input to a RNN model involves more than two dimensions. An example input 302 for a RNN is illustrated in FIG. 4. The RNN model accepts a 3D matrix as the input, with the 3D matrix including examples 310, variables 320 and time steps 330, with the variables 320 being values per time step of a parameter.

Figure 5:
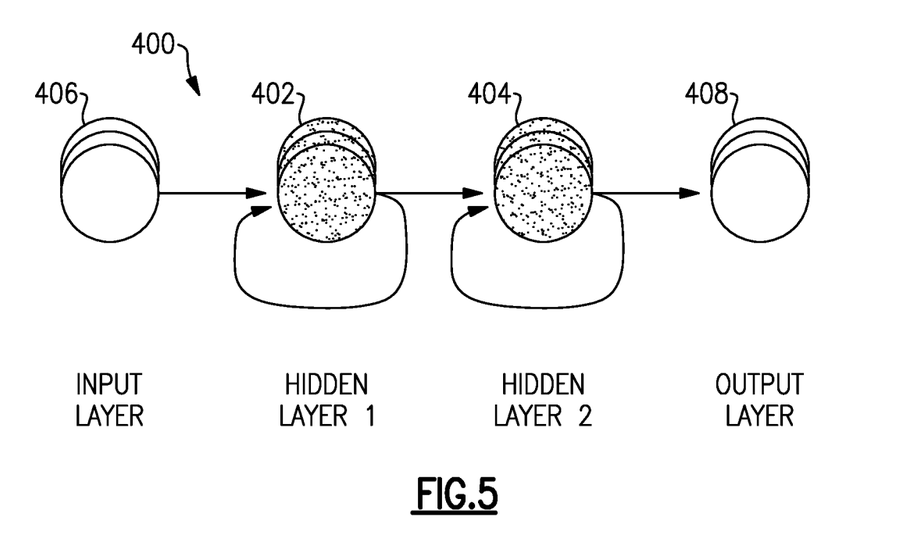
FIG. 5 illustrates an exemplary architecture of a recurrent neural network model.

With continued reference to FIGS. 1-4, FIG. 5 shows an architecture 400 of an exemplary RNN model. The RNN model includes cyclic hidden layers 402, 404 as illustrated in FIG. 3. An input layer 406 includes inputs provided as a 3D matrix, such as the input 302 illustrated in FIG. 4. The information flows forward from the inputs 406 through the hidden layers 402, 404 over different time-steps, and finally is used to predict an output 408. While the example of FIG. 5 illustrates two hidden layers 402, 404, it is appreciated that any number of additional hidden layers 402, 404 could be incorporated beyond the two illustrated hidden layers 402, 404.

Figure 6:
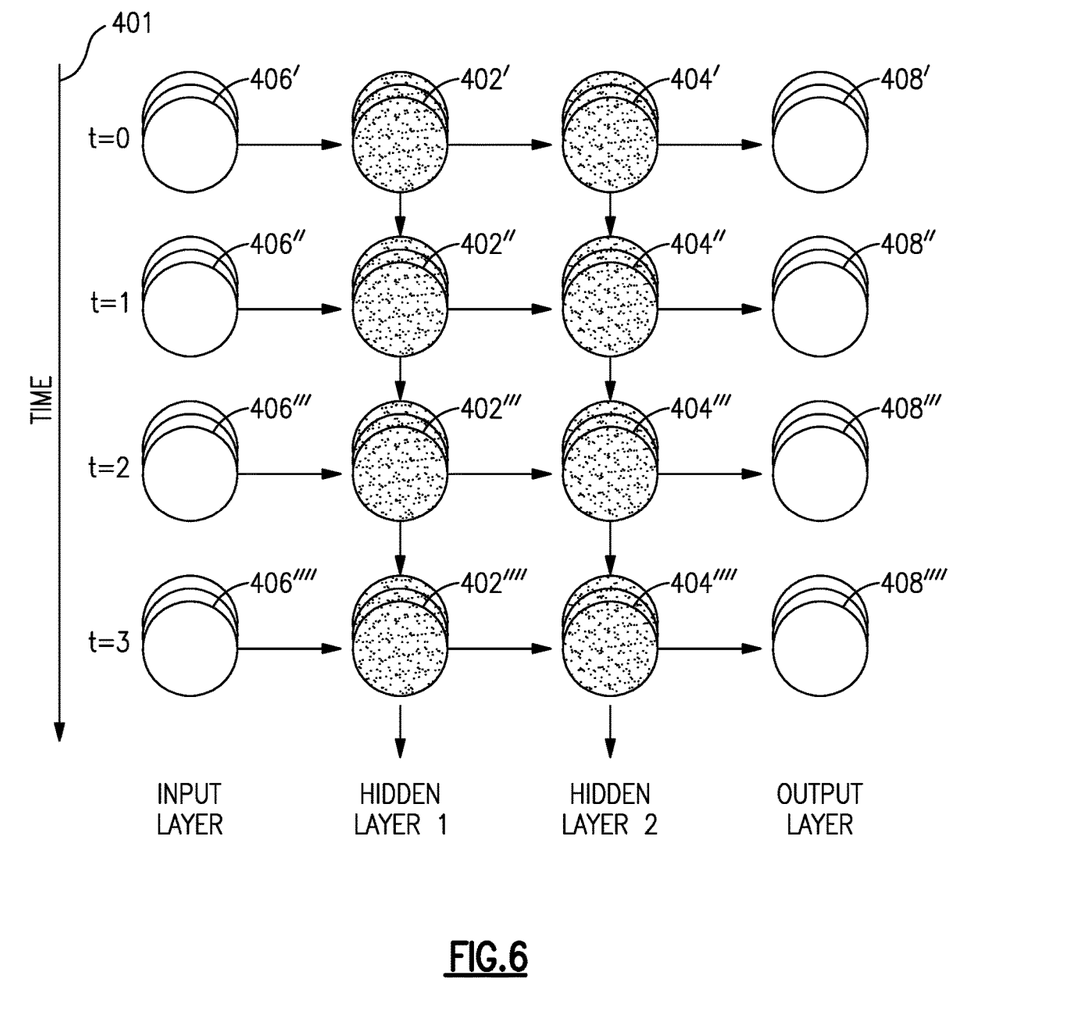
FIG. 6 illustrates the architecture of FIG. 5 unrolled along a time axis.

With continued reference to FIG. 5, FIG. 6 illustrates the architecture 400 unrolled along a time axis 401. The hidden layers 402, 404 accept information from both the input layer 406 at that time-step (t) and the hidden layer values 402, 404 from previous time-steps. With this approach, the prediction in the output layer 408 for later time-steps incorporates information from all previous time-steps.

The training phase for a RNN follows a similar approach as a traditional neural network, by using the back-propagation and gradient descent algorithms. The output of each hidden cell is a weighted sum of inputs to that cell passed through an activation function (Equation 1). The training/learning process determines the correct weights for each of the variables such the error in final prediction is minimized.

$$S_{ij}=g(in_{ij}) \text{ where } g(x)=1/(1+e^{-x}) \qquad \text{Equation 1.}$$

RNNs suffer from a "vanishing gradient problem" during the training phase of the network. This occurs when the gradients become too large or small, such that further iterations do not reduce the error function, leading to a poor model. The most effective way around this issue is to use Long Short Term Memory (LSTM) units. Unlike a typical RNN unit, such as a perceptron which have two gates (input and output); the LSTM unit utilized in the turbine engine deterioration model has three gates (input, out and forget).

The LSTM solves the vanishing gradient issue by creating a connection between the forget gate activation and gradient computation. When the forget gate is open, information from all time-steps flow through the cell without loss (telling the LSTM unit not to forget this information). Hence, the global gradient does not vanish for any iteration.

With continued reference to FIGS. 1-6, FIG. 7 illustrates an input 700 for RNN model tailored for determining gas turbine engine deterioration. The input 700 includes time steps 702 as one dimension, engine data 710, 712, 714, 716, 718 corresponding to the time steps 702, and engine serial numbers 720 correlating the engine data to a specific engine. By way of example, the engine data can include GPS data 710, engine or aircraft sensor data 712, 714, aerosol data 716, weather data 718, or any similar engine data.

Figure 7:
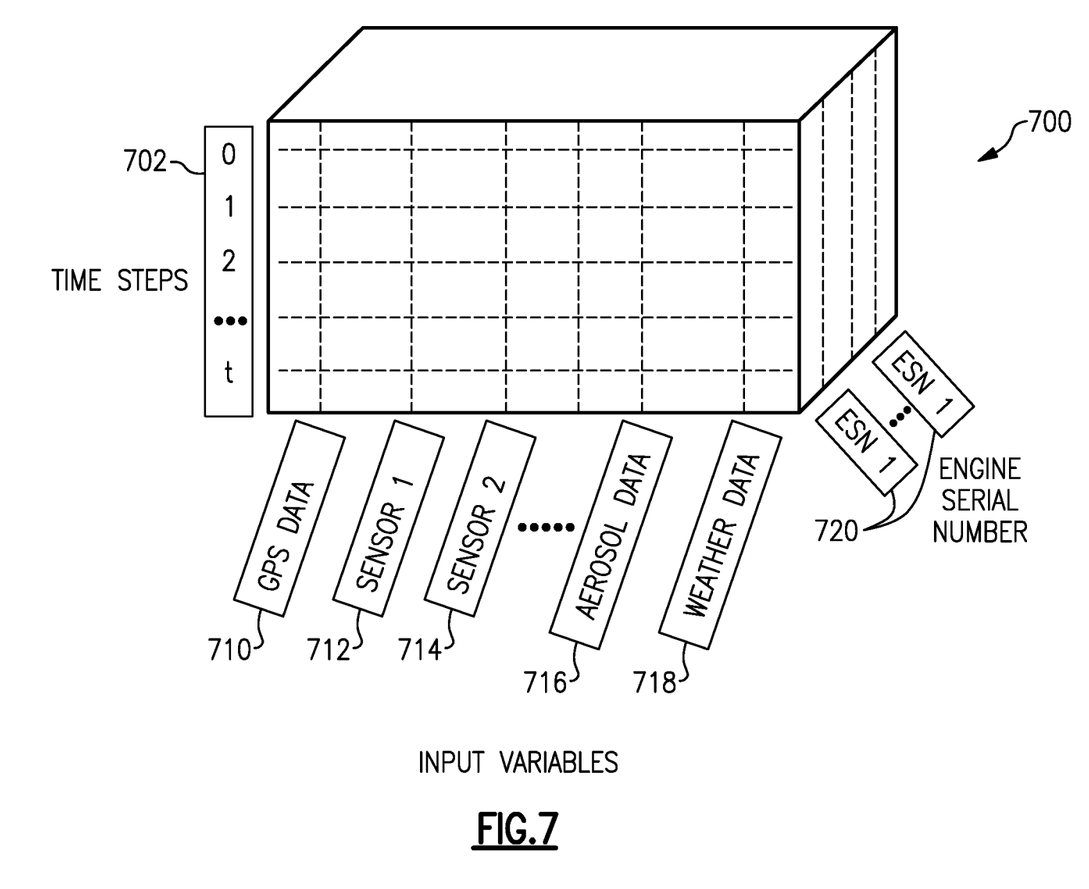
FIG. 7 schematically illustrates a recurrent neural network deterioration model tailored for gas turbine engine deterioration predictions.
Figure 8:
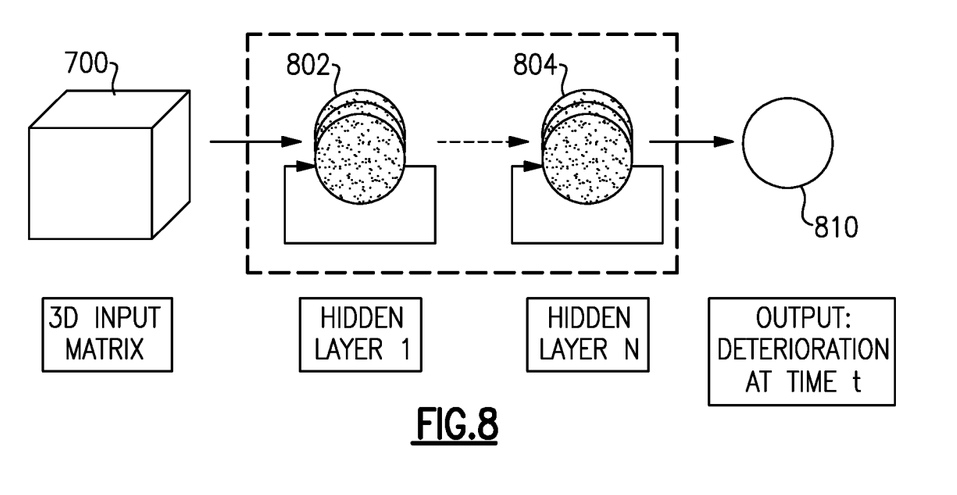
FIG. 8 illustrates an exemplary model architecture.
Figure 9:
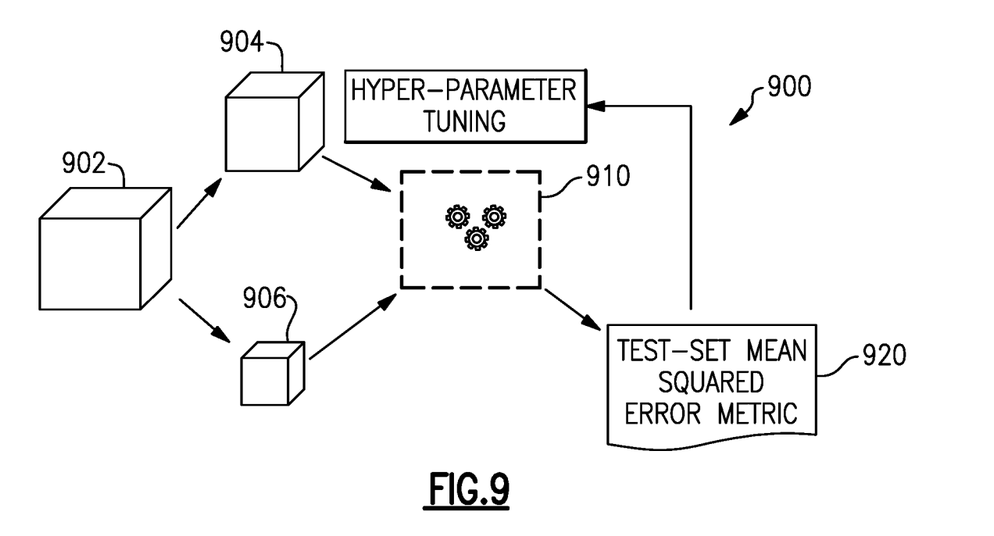
FIG. 9 illustrates a system for building the RNN model.

The input 700 of FIG. 7 is provided to a LSTM RNN model architecture, illustrated in FIG. 8, with the LSTM RNN architecture including the input matrix 700, two or more hidden layers 802, 804, and an output 810. The hidden layers are configured as described above with regards to FIGS. 5 and 6. The output 810 is the predicted deterioration of the engine at a time t.

With continued reference to FIGS. 1-7, FIG. 9 illustrates a system 900 for building the RNN model, alternatively referred to as training the model, or learning. The model building is an iterative process 900 where the input dataset 902 is first split into a training set 904 and a testing set 906. In one example, 70 percent of the input dataset 902 is utilized as the training set 904 and 30 percent of the input dataset 902 is used as the testing set 906. In alternative examples, other percentages may be used to similar effect. The training set 904 is used to build the model (optimizing weights, minimize error is prediction), as described above. An as-built model 910 is used to predict the deterioration for the test dataset 906. Based on a mean-squared error (MSE) metric 920 on test dataset, hyper-parameters in the model 910 are tuned and the process 900 is repeated again. This process 900 is iterated until the mean squared error metric 920 is minimized on the test data set 906. In some examples, the process 900 is iterated at least 50 times. In alternative examples, the process 900 is iterated between 50 and 100 times.

Further, In order to improve overall deterioration forecasting accuracy, a specific LSTM model is trained for each geographic region in which aircraft will be operating (SE Asia, Middle East, Europe, N America etc.) each region is optimized for causal factors important for that region. By way of example, the model for SE Asia may give more weightage to humidity and aerosols because of tropical weather and high pollution levels. Whereas, the model for N. America might focus on winter weather and snow storms, which can also have an adverse impact on deterioration.

When applying the model to a specific engine that has undergone rapid deterioration, the instances of rapid deterioration are identified. Then, based on region of operation of the engine, the input data of that engine is run through that region specific trained model. The model finds the best correlations between the input factors and the high deterioration. For example, the model might find that frequent high-power takeoffs from high altitude airports during summer months (with high tarmac temperatures), along with lack of maintenance such as waterwash is the leading cause of deterioration. Based on the correlating factors, a maintenance action/plan to reduce deterioration and increase life for the engine is devised.

Once implemented, the forecasting model (the prediction model) is used in multiple ways. First, as-manufactured engine parameters (i.e. the actual manufactured component details) and expected operating parameters of a new engine are provided to the forecasting model, and a maintenance schedule is determined based on when the expected required maintenance operations will occur. In addition to the initial maintenance scheduling, the as-used information of the engine is provided to the forecasting model on a continuous basis. This continuous operations data allows the forecasting model to update the predicted maintenance schedule to reflect actual parameters that cannot be predicted. By way of example, unpredictable parameters can include actual weather conditions, re-routing events, lower than expected loads, and the like. The updated actual use parameters impact the forecasted time on wing and the maintenance schedule is adjusted to account for the actual use based on the forecast model.

In one example, the forecasting model can be used by aircraft operators to plan and optimize route structures. In addition, if an engine is close to a shop-visit (based on low time on wing), optimizing the route can help in pushing the maintenance further in time. For example, if specific aircrafts (engines) are exhibiting higher deterioration in EGT margin compared to others in the fleet, the operator can look at the model predictions and interpretations to understand the root cause. If flying specific routes is causing the faster deterioration, a forecasting exercise can be conducted by changing the routes and estimating the impact. Based on the forecasting results, the operator can make a decision to switch aircrafts flying specific routes, in order to prolong time on wing and reduce overall deterioration of the fleet.

In another example, two engines from same operator can have different deterioration rates based on exact routes of operation (one flying more frequently to larger cities with higher pollution levels than other), on operational characteristics, and maintenance procedures (if water-washed regularly etc.). A fleet-level model is not able to capture the difference and hence estimate similar time on wing for both these engines. The model disclosed herein takes into account all the causal factors, and can provide a more accurate estimate.

In another example, the engine deterioration model can be used to propose intervals for on-wing maintenance such as waterwash. Based on historical evidence, it is known that the wash interval has a large impact on the EGT margin deterioration trend. A sensitivity analysis can be conducted by feeding in different wash intervals into the model and estimating long-term deterioration. An optimal interval can then be picked and recommended for the operator to use. The benefits of choosing the optimal interval can be quantified based on deterioration rate improvement over 1000 cycles (or some other metric).

In another example, an alerting system can be created to track engine deterioration with respect to the nominal rate (based on average from all fleets in operation). Whenever an engine deviates by a sufficiently large delta from the nominal rate and the model interpretation of factors suggest the cause related to environmental factors, waterwash can be recommended to remedy the situation.

In some examples, a trained forecast model can be maintained without being adjusted to include future data sets. In such an example, once determined by the process described in FIG. 3, the forecast model is static. In alternative examples, as more engines are utilized, and more data is collected, the forecast model can be updated further to achieve more accurate predictions. When updating to reflect more data, the process of FIGS. 2 and 3 are reiterated with the newly collected data, and a new forecast model is arrived at.

The forecast module described herein provides a systematic method for combining heterogeneous data from multiple distinct data sources in order to build the forecasting model using machine learning. The forecasting model optimizes maintenance intervals by preventing unscheduled removals and allows for predictive support with route planning and fleet deployment by allowing a user to predict the results of various deployments, thereby allowing the user to optimize a time on wing for each engine in a fleet.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for forecasting aircraft engine deterioration comprising:
   flying an aircraft using a first actual aircraft engine and creating a first fused data set corresponding to the first actual aircraft engine, the first fused data set including at least one as manufactured parameter of the first actual aircraft engine, expected operating parameters of the first actual aircraft engine, and actual operating parameters of the first actual aircraft engine, the actual operating parameters of the first actual aircraft engine including internal aircraft sensor data, and external flight tracking data; and
   predicting an expected engine deterioration of the first actual aircraft engine based on the expected operating parameters and the actual operating parameters of the first actual aircraft engine by applying the first fused data set to a forecasting model, wherein the forecasting model is a recurrent neural network based algorithm, and the recurrent neural network based algorithm is trained via a plurality of second fused data sets corresponding to actual aircraft engines;
   including the step of taking off and landing the aircraft and the external flight tracking data includes at least one environmental condition at at least one of the takeoff and the landing; and
   the aircraft flying an aircraft route and in an aircraft operating region, and the first actual aircraft engine is moved to at least one of a second aircraft route and a second aircraft operating region based upon the engine deterioration of the first actual engine.

2. The method of claim 1, wherein a maintenance schedule for the first actual engine is changed based upon the prediction of expected engine deterioration, and maintenance is performed on the first actual aircraft engine based upon the changed maintenance schedule.

3. The method of claim 2, wherein the maintenance includes a water wash of at least a portion of the first actual aircraft engine.

4. A method for forecasting aircraft engine deterioration comprising:
   flying an aircraft using a first actual aircraft engine and creating a first fused data set corresponding to the first actual aircraft engine, the first fused data set including at least one as manufactured parameter of the first actual aircraft engine, expected operating parameters of the first actual aircraft engine, and actual operating parameters of the first actual aircraft engine, the actual operating parameters of the first actual aircraft engine including internal aircraft sensor data, and external flight tracking data; and
   predicting an expected engine deterioration of the first actual aircraft engine based on the expected operating parameters and the actual operating parameters of the first actual aircraft engine by applying the first fused data set to a forecasting model, wherein the forecasting model is a recurrent neural network based algorithm, and the recurrent neural network based algorithm is trained via a plurality of second fused data sets corresponding to actual aircraft engines;

the aircraft flying an aircraft route and in an aircraft operating region, and the first actual aircraft engine is moved to at least one of a second aircraft route and a second aircraft operating region based upon the engine deterioration of the first actual engine; and wherein a maintenance schedule for the first actual engine is changed based upon the prediction of expected engine deterioration, and maintenance is performed on the first actual aircraft engine based upon the changed maintenance schedule.

5. The method of claim 4, wherein the maintenance includes a water wash of at least a portion of the first actual aircraft engine.

* * * * *